US005635814A

United States Patent [19]
Afzal et al.

[11] Patent Number: 5,635,814
[45] Date of Patent: Jun. 3, 1997

[54] MODULAR BATTERY SYSTEM HAVING A PLUGGABLE CHARGING MODULE

[75] Inventors: Ejaz Afzal; Bradley E. Bylund, both of Laguna Niguel; Charles W. Frank, Jr., Irvine; Darrel W. Pontius, Yorba Linda, all of Calif.

[73] Assignee: International Components Corporation, Chicago, Ill.

[21] Appl. No.: 389,248

[22] Filed: Feb. 16, 1995

[51] Int. Cl.$^6$ .................................................. H01M 10/46
[52] U.S. Cl. .......................... 320/2; 320/49; D13/103; 429/100; 429/149
[58] Field of Search ........................... 320/2, 5, 30, 35, 320/36, 39, 40, 49, 57; 429/96, 97, 98, 99, 100, 149; D13/103, 107, 108

[56] References Cited

U.S. PATENT DOCUMENTS

| | | |
|---|---|---|
| 3,402,339 | 9/1968 | Abrams. |
| 3,458,794 | 7/1969 | Bohnstedt et al. |
| 3,876,921 | 4/1975 | Bigbee, III. |
| 4,086,523 | 4/1978 | Izumi. |
| 4,242,627 | 12/1980 | Kisiel. |
| 4,321,523 | 3/1982 | Hammel. |
| 4,467,263 | 8/1984 | Conforti et al. |
| 4,611,161 | 9/1986 | Barker. |
| 4,658,199 | 4/1987 | Hoffman. |
| 4,743,829 | 5/1988 | Fenne et al. |
| 4,794,315 | 12/1988 | Pederson et al. |
| 4,849,682 | 7/1989 | Bauer et al. ............ 320/35 X |
| 5,017,856 | 5/1991 | Johnson, Jr. |
| 5,057,381 | 10/1991 | Persen. |
| 5,151,727 | 9/1992 | Sasaki .................... 354/76 |
| 5,160,879 | 11/1992 | Tortola et al. |
| 5,191,276 | 3/1993 | Zainaleain. |
| 5,198,743 | 3/1993 | McClure et al. |
| 5,306,576 | 4/1994 | Sasaki .................... 429/98 |
| 5,459,389 | 10/1995 | Fujiwara et al. ........... 320/2 |

FOREIGN PATENT DOCUMENTS 9003059  8/1989  WIPO.

OTHER PUBLICATIONS

"Electronic Design", Aug. 19, 1993, Article entitled NICD Battery Charger Hides in a C–Line Plug, pp. 41–42, 46, 48, 50, and 53.

"High Power Flyback Switching Regulators", by Neil Kepple, Keltec Company, Ft. Walton, FL (Originally presented at WESCON 77, Sep. 20, 1977, San Francisco, CA).

Product and Applications Handbook, Unitrode Integrated Circuits, 1993–94, pp. 9–47 thru 9–50, and 5–179 thru 5–185.

Primary Examiner—Edward Tso
Attorney, Agent, or Firm—Fitch, Even, Tabin & Flannery

[57] ABSTRACT

A modular battery system for a portable device including a charging module with a retractable plug and charging circuit for converting an AC line voltage to a DC battery charging current. The charging module combines with a battery module and optional fuel gauge (if present) to form a single unit for recharging, preconditioning the battery, and connection to the portable device. The modules are releasably connected, preferably involving conductive fasteners, so that a user may connect a new battery module to an old charging module. The releasable connection serves as both the mechanical and the electrical interface between the battery module and the charging module. The conductive fasteners may be located in different positions on the modules to accommodate different connector geometries. The charging module may also combine with a battery mounting module, rather than the battery module, so that the system works with conventional battery packs. The preferred charging module incorporates a PWM charging circuit having a transformer with a primary winding, a secondary winding, and a control winding. The control winding has two purposes, it provides feedback information and it provides operating current for the continued operation of the PWM charging circuit. The transformer is designed so that the primary winding has a better magnetic coupling with the secondary winding than with the control winding so that the charging circuit will run in a safe low-power "standby" mode in the event of a short circuit in the secondary circuit. The feedback circuit from the control winding is preferably filtered through a low-pass filter to remove "flyback" transients.

6 Claims, 11 Drawing Sheets

MODULAR BATTERY SYSTEM HAVING A PLUGGABLE CHARGING MODULE

BACKGROUND OF THE INVENTION

1. Field of the Invention

The present invention relates generally to rechargeable batteries and, more specifically, to a modular battery system providing different connector geometries for use with electronic devices such as camcorders, cellular phones, and portable computers.

2. Description of Related Art

The miniaturization of electronics has provided society with numerous portable electronic devices. The list is long, but such devices include portable computers, camcorders, and cellular phones. Portable electronic devices invariably require batteries.

Rechargeable batteries are often used because they are much cheaper than disposable batteries in the long run. The technology of battery recharging systems, however, has not kept pace with the needs of users.

For example, the typical owner of a camcorder is probably burdened by two or three rechargeable battery packs and a single "charging station" for recharging the battery packs when they are not in use. Charging stations supplied with camcorders or other portable devices are generally bulky and require a power cord for operation. In this case, if the camcorder is to be used for an extended period of time, it is necessary to carry extra batteries, the charging station, or both. Although miniaturization has made the battery-operated device easy to carry, the need for battery replacement or charging makes the portability of the end solution questionable.

Another problem with rechargeable systems is the variety of line voltages encountered around the world. A recharger designed for one country ordinarily requires an "adapter" for use in another country. This further impacts portability by requiring the user to carry another device when travelling.

Another problem faced by the user is the potential for some rechargeable batteries to exhibit a reduction in capacity due to the battery being subjected to repetitive shallow discharge and charge cycles. This can create a "memory" effect that makes the battery unable to deliver its rated charge. In order to eliminate this effect, it is recommended to discharge the battery to a low level before charging. Many users will purchase an additional unit called a "conditioner" to accomplish the discharge cycle before charging. This can result in yet another device being carried.

Another significant aspect of charging batteries is the effect of overcharging the batteries. A battery which is overcharged is unable to convert charge energy into stored energy. The charge energy is converted to heat which, over time, will reduce the capacity of the battery dramatically, and may even cause complete battery failure. Most users are not able to closely monitor the amount of time a battery spends under charge. Therefore, unless the charging station affords overcharge protection, the useful life of the battery may be shortened.

An additional burden on the user of rechargeable batteries is knowing the current capacity of the battery. If not known, the user must either guess and chance a failure at a critical time, or must preemptively charge the battery. Even when batteries have been fully charged, they lose capacity during storage due to an internal loss called "self-discharge."

A single unit that simply includes a charger and rechargeable batteries does not resolve the foregoing problems. The unit must be compact and lightweight since the charger is always present. Moreover, the combination may create other problems. For example, since the charger is likely to be usable even after the batteries require replacement, a combination charger/battery pack may be more costly than necessary since the system must be purchased and replaced as a unit.

SUMMARY OF THE INVENTION

The foregoing demonstrates that there is a need to provide a compact, modular battery system useful for recharging a battery and for powering a portable device, as follows:

The present invention resides in a modular battery system comprising a battery module having means for supporting a rechargeable battery; and a charging module having a battery charging circuit and having a retractable plug for connection to an AC line voltage, the modules having interconnection means to releasably mechanically fasten the modules together while engaging with electrically conductive connecting means within the modules, and to attach the interconnected modules to a portable device as a unit. The resulting modular battery system is convenient to use and recharge, even while traveling, as the charging unit is sandwiched between the battery module and the portable device when the battery system is attached to and applying power to the device. The two modules are mechanically fastened together with a screw-and-nut combination. The charging module has a perimeter which matches that of the battery module and is compatible with the portable device's battery mounting facilities. Moreover, the battery system is simple and cost-effective to repair when the rechargeable battery is no longer serviceable since the consumer can reuse an old charging module with a new battery module.

In a preferred embodiment, the present invention provides a manufacturing method for alternative charging modules, having contact geometries supporting either widely-spaced-apart VHS portable device contacts or narrowly-spaced-apart 8 mm contacts so that the modules can be variably combined into a first battery system to connect to a first-type of portable device and a second battery system for a second-type of portable device. The manufacturer may use the modules to assemble battery systems for different devices using common components.

In a further aspect, the present invention provides a modular battery system wherein the releasable mechanical connections between the modules also serve as the electrical connections to the battery and, preferably, also to a thermistor located in thermal conductive contact with the battery. The preferred connections comprise conductive screws that extend through apertures in the charging module in conductive contact with an internal charging circuit and into conductive nuts in the battery module in conductive contact with the battery and the thermistor.

The battery system provides, in a further aspect of the invention, a charging module, including a charging circuit, and exposing charging connectors which conduct current from the circuit and which form the first half of an electrical connection and a mechanical coupling. The invention further provides a battery module removably connected as the second half of the electrical and mechanical connection.

The present invention further resides in a battery system which may optionally have a modular charge remaining indicator (hereinafter "fuel gauge") circuit and corresponding display attached to the battery module. The preferred fuel gauge comprises a modular circuit board supporting a computing device and a graphic overlay that fit into a recess on the battery module. The circuit board beneficially has three conductive pads which electrically connect to both sides of the battery and to a current sensing resistor via conductive springs. This means of connecting the sensing resistor without requiring soldered wires permits the fuel gauge option to be added at any time after initial assembly of the battery module.

In a further aspect, the present invention provides a second preferred battery system that advantageously works with conventional battery packs. Ordinarily, such battery packs connect directly to the device, the battery pack having a device mounting surface and the device having a complementary battery mounting surface. This battery system is characterized by a charger having a supplementary battery mounting surface on one side and a supplementary device mounting surface on the other. The conventional battery connects to the charger's supplemental battery mounting surface to form a convenient, transportable unit. The battery and the charger, as a unit, connect to the device via the charger's supplemental device mounting surface. The preferred charger comprises the charging module of the first preferred battery system (which carries the supplemental device mounting surface) and a battery mounting module which carries the supplemental battery mounting surface.

In a further aspect, the present invention provides a battery system having a postcharging trickle charging mode which compensates for internal battery module self-discharge and beneficially enables the user to leave the battery pack plugged into a source of AC power for periods of three months or more with the battery pack maintaining a full state of charge and ready for use at any time.

In a further aspect, the present invention provides a battery system having a preconditioning circuit which enables the rechargeable battery to be beneficially discharged to a low level of charge, thus preventing the accumulation of shallow discharge cycles which can restrict the amount of charge acceptance by the battery module.

In a further aspect, the present invention provides a battery system having a PWM charging circuit, operable over a full range of AC power sources, which comprises a special transformer construction wherein the transformer has a primary winding, a secondary winding, and a control winding which provides electrically isolated information about the secondary winding. The circuit is arranged so that the control winding also provides the necessary operating current to keep the circuit running. The preferred transformer is constructed so that the primary winding has a greater magnetic coupling with the secondary winding than with the control winding. As a result, given a short condition in the secondary winding, the current impressed on the control winding will drop below the level needed to keep the circuit running and the circuit will go into a "safe" mode.

In a further aspect, the present invention provides a PWM charging circuit having a galvanically isolated control winding for providing feedback information wherein a low-pass filter is provided in the feedback path to minimize the detrimental effect of fly-back spikes caused by self-inductance and leakage currents in the primary winding. The overall design of the charging circuit enables the circuit to be extremely compact in volume for the charge capacity provided, thus enabling the inclusion of a full feature set and a higher capacity battery in the battery system than might otherwise be possible.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may be best understood by reference to the following description, taken in connection with the following drawings, of which:

DETAILED DESCRIPTION OF THE PREFERRED EMBODIMENTS

The following description relates to a modular battery system having a battery module and pluggable charging modules with alternative connector geometries and charge control and conditioning features.

Figure 2:
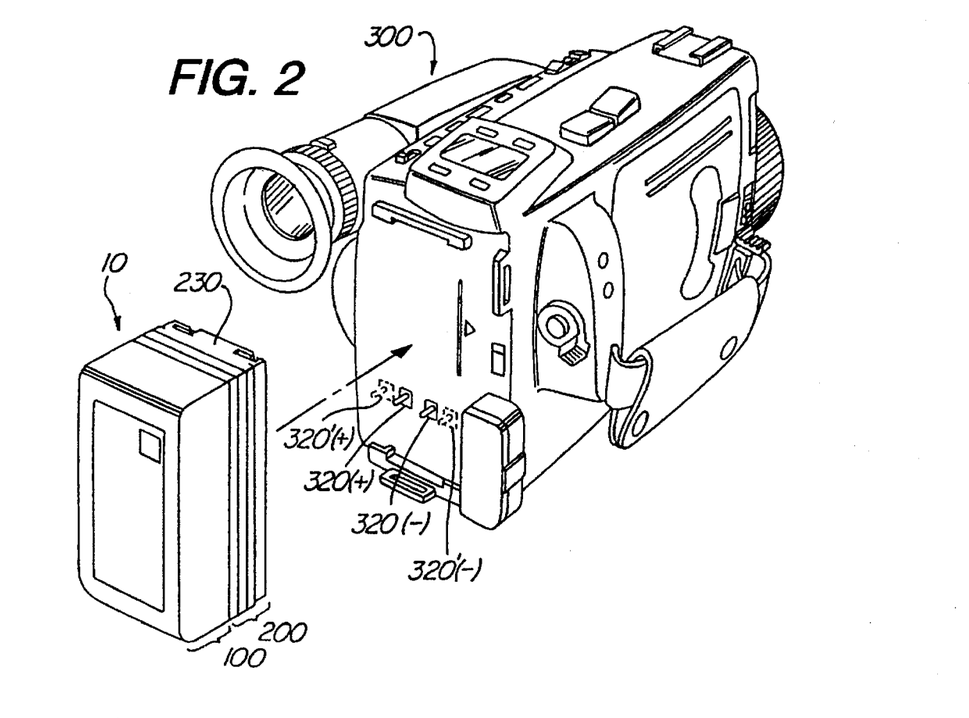
FIG. 2 is a rear perspective view of the first preferred modular battery system 10 being attached to a camcorder 300.

FIG. 2 shows a first preferred modular battery system 10 according to the present invention. The preferred modular battery system 10 is designed to provide power to an ordinary camcorder 300. The innovative principles of the modular battery system 10, however, could be embodied in a battery system configured for other battery-powered devices such as cellular phones and portable computers.

A video camcorder, as shown in FIG. 2, may have one of two contact configurations: (1) narrowly-spaced-apart Sony 8 mm type contacts 320(−), (+) (shown in solid lines); and (2) widely-spaced-apart Panasonic VHS-C type contacts 320'(−), (+) (suggested by dashed lines). The present invention is modular so that common components can be used to make a first modular battery system 10 for the narrowly-spaced-apart Sony contacts 320, 320, as well as a second modular battery system 10' for the widely-spaced-apart Panasonic contacts 320', 320'.

Figures 1A, 1B:
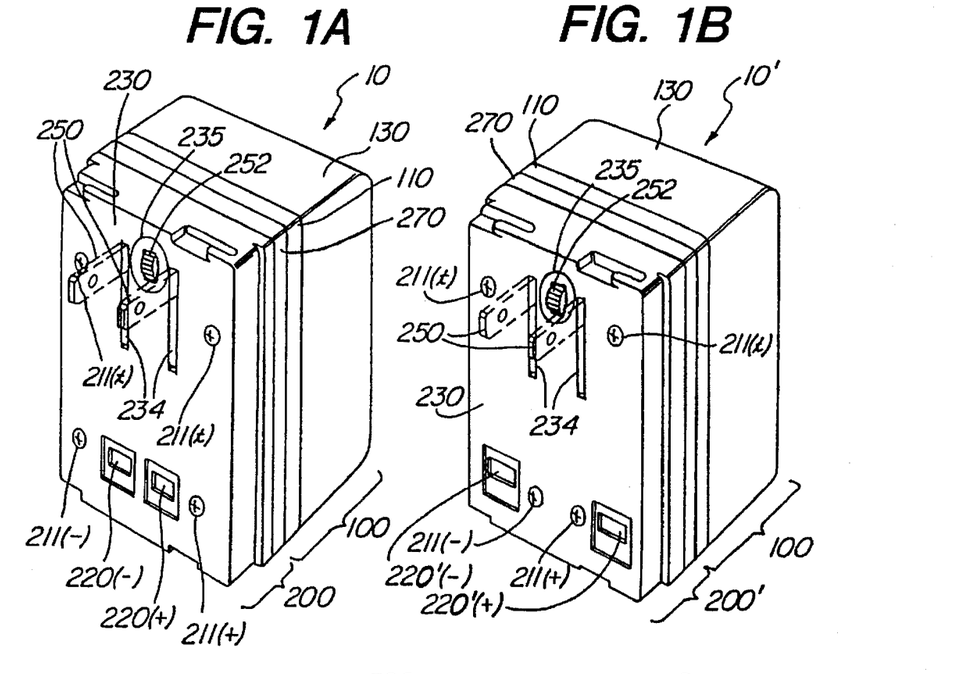
FIG. 1A is a front perspective view of the first preferred battery system 10 comprising a battery module 100 releasably connected to a first charging module 200.
FIG. 1B is a front perspective view of a second preferred battery system 10' comprising a battery module 100 (like that shown in FIG. 1A) releasably connected to a second charging module 200'.

Each of FIGS. 1A and 1B shows an assembled modular battery system (10, 10') in accordance with the present invention. As shown, each fully assembled modular battery system 10, 10' comprises two modular components: (1) a battery module 100; and (2) one of two charging modules 200, 200'. The battery module 100 is the common element in the preferred system. The system could, however, be reversed to have a common charging module and different battery modules. Each of the modules 100 and 200, 200' have a matching perimeter so that the assembled battery system can be attached to the portable device in place of an ordinary battery pack This description will use regular numbers (e.g. 10) for components associated with the first charging module 200 and prime numbers (e.g. 10') for analogous components associated with the second charging module 200'.

Figure 3:
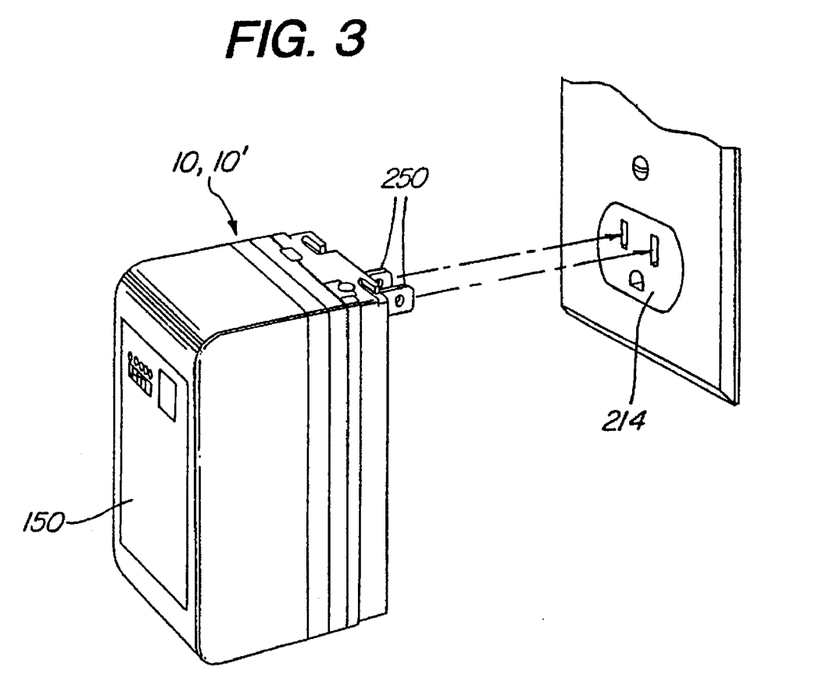
FIG. 3 is a rear perspective view of the first or second modular battery systems 10, 10' of FIGS. 1A or 1B (the rear views being identical) being connected to a wall socket 214 for recharging.

Each preferred charging module 200, 200' includes a base 230 with a second mating surface shown in FIGS. 1A and 1B, that carries a retractable plug 250 and a recessed thumb wheel 252. The base 230 provides molded features enabling attachment means for a standard camcorder 300 or a connection means with the retractable plug to a standard wall receptacle 214. The thumb wheel 252 rotates the plug 250 between a retracted position and an extended position (shown in dashed lines). The plug 250 is retracted to mount the modular battery system 10, 10' to the camcorder 300 as shown in FIG. 2 and is extended to mount the modular battery system 10, 10' to a wall receptacle 214 for recharging as shown in FIG. 3. Note that when the modular battery system is attached to the portable device, the charging module is conveniently sandwiched between the battery module and the device for ease of transport. The plug 250 preferably rotates near the top of the battery pack 10, 10' so that the battery pack 10, 10' does not obstruct the upper receptacle (not shown) when plugged into the lower receptacle 214 for recharging. The plug 250 could slide rather than pivot.

Figure 4:
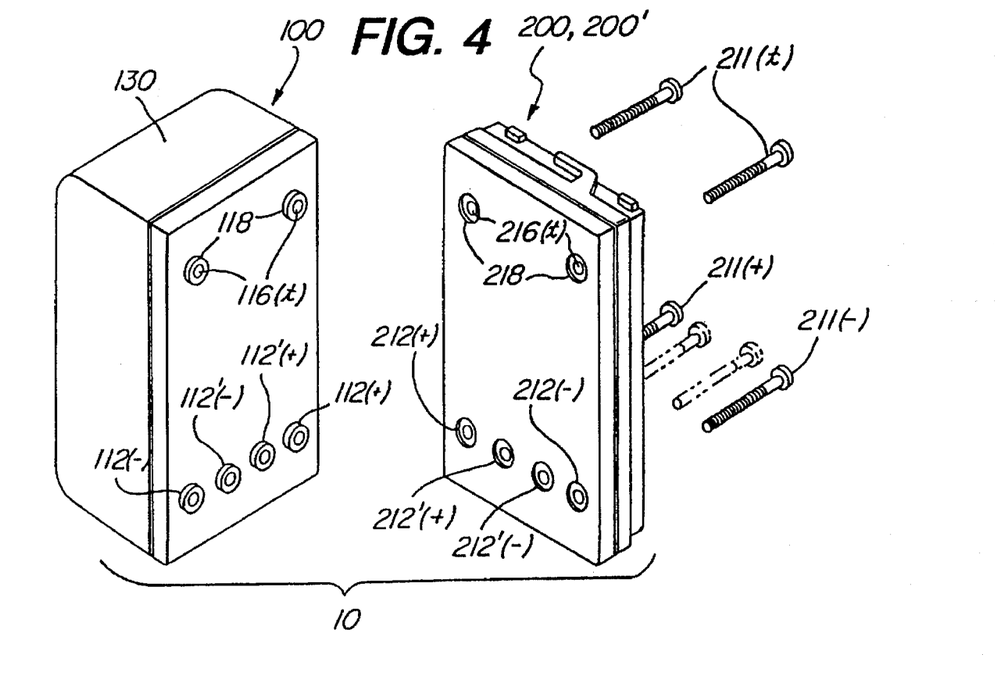
FIG. 4 is an exploded perspective view showing the combined electrical and mechanical interconnection of the battery module 100 with one of the first or second charging modules 200, 200'.
Figures 5, 5A:
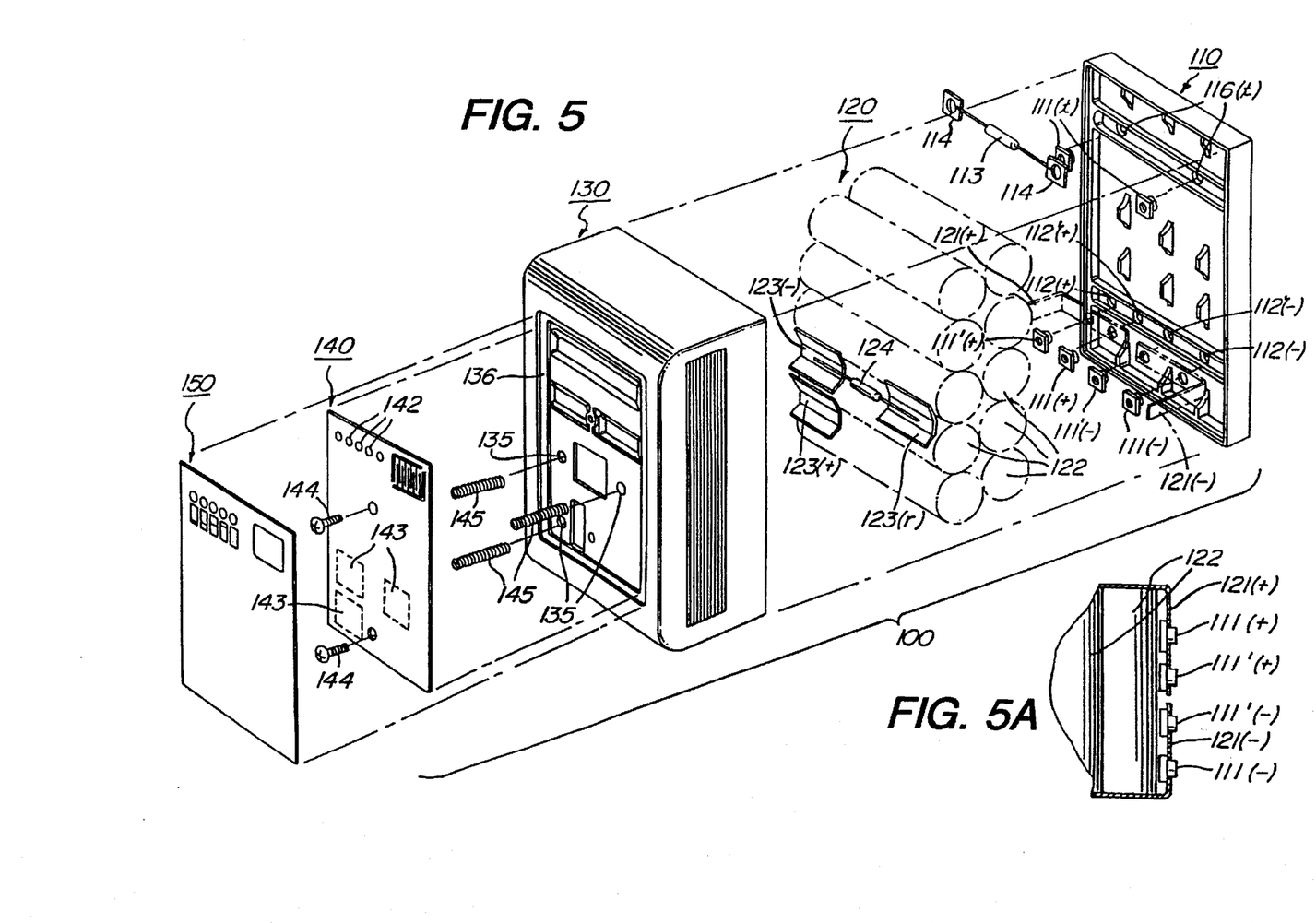
FIG. 5 is an exploded perspective view of the preferred battery module 100 including the housing means, connections, and rechargeable battery cells.
FIG. 5A is a partial top plan view of the battery pack 122 of FIG. 5.

Each charging module 200, 200' also includes a pair of contacts 220, 220 or 220', 220'. The first charging module 200 of FIG. 1A has the narrowly-spaced-apart Sony-type contacts 220(−), (+) and the second charging module 200' of FIG. 1B has the widely-spaced-apart Panasonic-type contacts 220'(−), (+). The contacts provide means for electrically connecting the rechargeable battery to the portable device FIG. 4 shows the preferred means for releasably electrically and mechanically interconnecting the modules. Here, one of the charging modules 200, 200' with a first mating surface shown, is being connected to the mating surface of the battery module 100 with four conductive screws 211 comprising the charging connectors, an upper pair of "thermistor" screws 211(t), (t), and a lower pair of "conductor" screws 211(+), (−). The lower screws 211(+), (−) are positioned one way (solid lines) for the first charging module 200 and another (dashed lines) for the second charging module 200'. The different screw positions are best understood by referencing FIG. 4 along with the exploded view of the first and second charging modules 200, 200' (FIG. 6) and the exploded view of the battery module 100 (FIG. 5).

The preferred battery module 100 will be described first. As shown in FIGS. 5 and 5A, the battery module 100 supports a rechargeable battery and connecting means comprising a plastic base plate 110, six conductive t-nuts 111, a battery pack 120 comprising a plurality of nicad battery cells 122, a plastic cover 130, and an optional "fuel gauge" comprising a circuit board 140 and a graphic overlay 150. The battery pack cells 122 are arranged to form a battery pack using techniques well known in the art, comprising conductive straps to connect the cells in a series-parallel arrangement to achieve the voltage and capacity required by the portable device, strips of tape to bind the cells together in a stacked arrangement, and strips of insulating material to prevent shorting of battery connections. The six t-nuts 111, (sometimes hereinafter "nuts") include an upper pair of thermistor nuts 111(t), (t) that are connected to a thermistor 113 having lugs 114. The thermistor t-nuts are inserted through the lugs into the apertures 116(t) to hold the thermistor in place. When the module is assembled, the thermistor is placed in thermally conductive contact with the battery pack 120. The battery connecting means further include a lower pair of positive conductor nuts 111(+), 111'(+) that are connected to a positive side of the battery pack 120 with a conductive strap 121(+), and a lower pair of negative conductor nuts 111(−), 111'(−) that are connected to a negative side of the battery pack 120 via sense resistor 124 with a conductive strap 121(−). The six nuts 111 are located behind six corresponding screw apertures 112(+), (−), 112' (+), (−), 116(t), (t) in the base plate 110. The resulting battery module 100 has a widely-spaced-apart pair of conductor nuts 111(+), (−) and a narrowly-spaced-apart pair of conductor nuts 111'(+), (−) so that it may connect to a first charging module 200 or a second charging module 200', as shown in FIG. 4.

Figure 7:
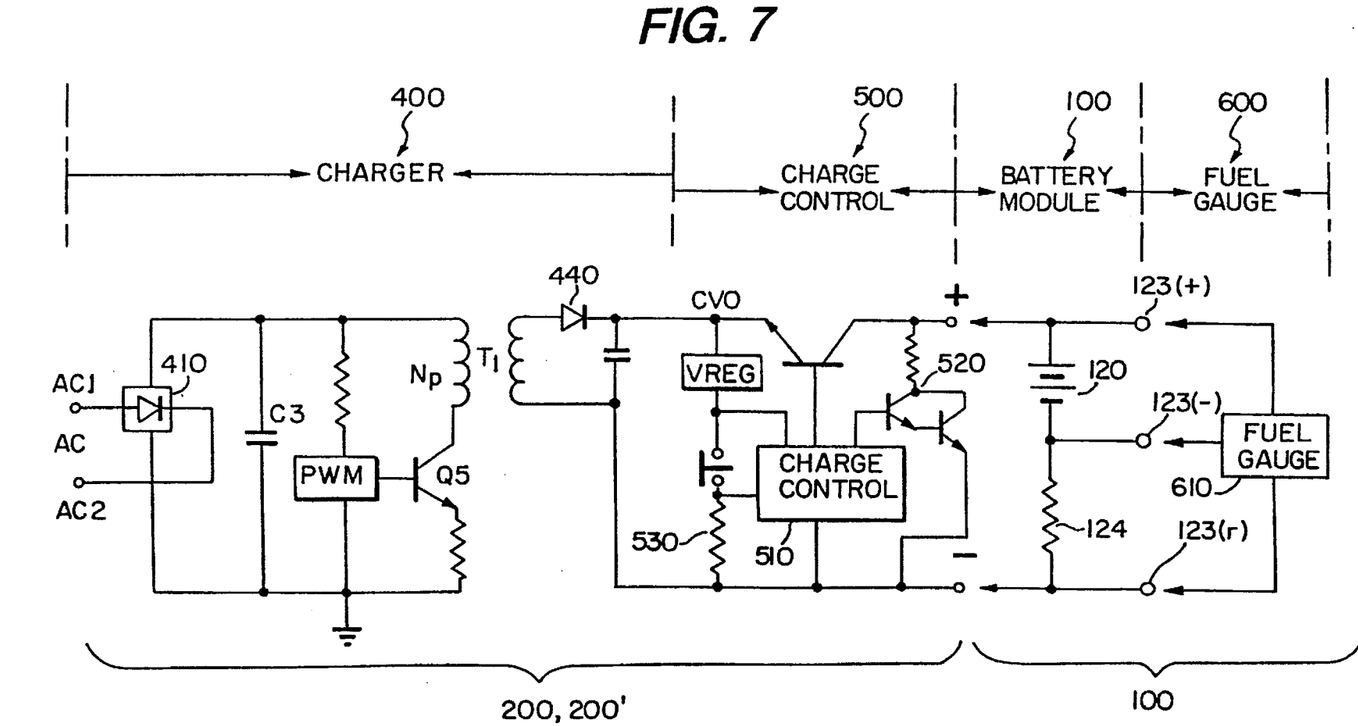
FIG. 7 is a functional schematic of the preferred charging circuit 400 and charging control circuit 500 used in the first and second charging modules 200, 200', and battery module 100, with optional fuel gauge circuit 600.

An optional "fuel gauge" is implemented on a circuit board 140 which supports a computing device, known as a fuel gauge chip, and graphic overlay 150 that fits into a recess 136 on the front of the cover 130. If no "fuel gauge" is used, a filler cover (not shown) is put in the recess 136. The circuit board 140 must electrically contact the sense resistor 124 and both sides of the battery pack 120 to monitor the current flowing into and out of the battery. In the preferred embodiment, three conductive springs 145 extend on either side of three cover apertures 135. The electrical contacts are made when the springs are squeezed between three contact pads 143 on the circuit board 140 and three contacts 123(+), (−), and 123(r) on the battery pack 120. The preferred contacts 123 have a folded configuration with flat bottom to achieve reliable contact with the springs 145. The circuit representation of the three contacts is shown in FIG. 7. The operation of a "fuel gauge" circuit 600 carried by the circuit board 140 will be described below.

Figure 6:
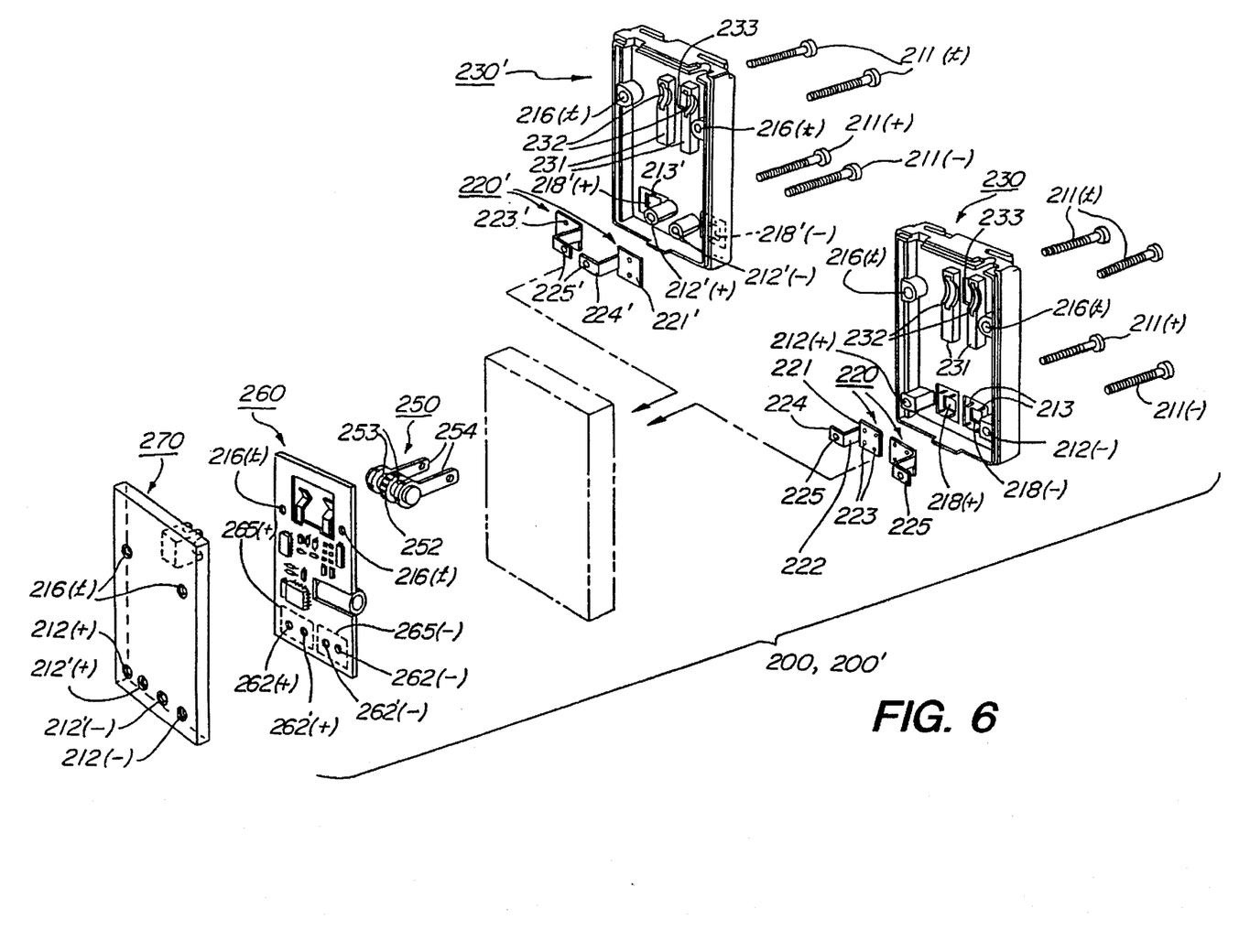
FIG. 6 is an exploded perspective view of the first and second preferred charging modules 200, 200' showing their separate and common components, including the housing means, the charging circuit board, and connections.

As shown in FIG. 6, the first and second charging modules' 200, 200' housing means and connection means respectively comprise a first plastic base 230 with narrowly-spaced-apart contacts 220, 220 and a second plastic base 230' with widely-spaced-apart contacts 220', 220'. A charging module 200 or 200' further comprises a retractable plug 250, a circuit board 260, and a plastic cover 270. As suggested by the dashed rectangle, one of the bases 230, 230' and a corresponding pair of contacts 220, 220' are combined with the other components to form the first charging module 200 or the second charging module 200'.

The upper portions of the bases 230, 230' are preferably identical. Each carries a pair of internal plug bosses 231, 231 having arcuate apertures 232 to rotatably support the plug's axle 253 and for passage of the plug's prongs 254. As best shown in FIGS. 1A and 1B, the plug bosses 231, 231 define corresponding slots 234, 234 on the outside of the bases 230, 230' for receiving the plug's prongs 254, 254 when the plug 250 is retracted. A single, centrally located aperture 235 is provided for exposing part of the plug's thumb wheel 252 to the outside.

The base 230 or 230', the circuit board 260, and the plastic cover 270 have thermistor screw holes 216(t), (t) so that the thermistor screws 211(t), (t) can pass through the charging module 200 and reach the thermistor nuts 111(t), (t) in the battery module 100.

The lower portions of the bases 230, 230' are quite different. The first base 230 has only widely-spaced-apart screw holes 212(+), (−) to provide room for narrowly-spaced-apart contact apertures 218(+), (−). The second base 230' has only narrowly-spaced-apart screw holes 212'(+), (−) to provide room for widely spaced-apart contact apertures 218'(+), (−).

The circuit board 260 and the plastic cover 270, however, have widely-spaced-apart screw holes 212(+), (−) and narrowly-spaced-apart screw holes 212'(+), (−) so that the conductor screws 211(+), (−) can pass through the either charging module 200 or 200' and reach a pair of conductor nuts in the battery module 100. The conductor screws pass through the widely-spaced-apart screw holes 212(+), (−) for the first charging module 200 and through the narrowly-spaced-apart screw holes 212'(+), (−) for the second charging module 200'.

The screw connections have a dual-purpose electromechanical character. The screws mechanically connect the charging module 200 or 200' to the battery module 100 and electrically connect the charging module's circuit board 260 to the battery module's thermistor 113 and battery pack 120.

The preferred contacts 220, 220', as shown in FIG. 6, comprise a first horizontal contact portion 221, 221', a vertical extension portion 222, 222', and a second horizontal portion 224, 224' having a screw hole 225, 225'. For ease of assembly and fastening, alignment pins 213, 213' are provided adjacent the contact apertures 218, 218' and corresponding alignment apertures 223, 223' are provided on the horizontal contact portions 221, 221'. When the battery module 100 is assembled to one of the charging modules 200, 200, the conductor screws 211(+), (−) pass through the screw holes 225, 225' in the conductors 220, 220'. By this arrangement, the horizontal portions 224, 224' of the contacts 220, 220' are pressed against conductive pads 265(+), (−) on the circuit board 260. The circuit board 260 is thereby electrically connected to the conductors 220, 220' and, by way of the conductors, to the conductor screws 211(+), (−) and, by way of the conductor screws, to the battery pack 120.

The present invention provides a modular system wherein a common battery module can be interconnected with different charging modules having different connector geometries. The charging modules can be beneficially detached from a spent battery module and reused. In addition, the dual-purpose electromechanical connectors provide a simple, compact mechanism for reliable electrical contact, ease of assembly in manufacturing, and ease of battery replacement by the consumer.

Another aspect of the present invention is a portable charger 50, 50' that works with a conventional, commercially available, rechargeable battery 800. The invention is best understood with initial reference to FIGS. 13 and 14. As shown, the charger 50 preferably has a perimeter that matches a perimeter of the battery 800 to form a compact battery/charger unit 60. The resulting battery/charger unit 60 is compact and easily transported. Moreover, the charger 50 is always available for recharging the battery 800 in a wall plug 214 because it remains with the battery/charger unit 60 when mounted to a portable device 30 like a camcorder.

Figure 13:
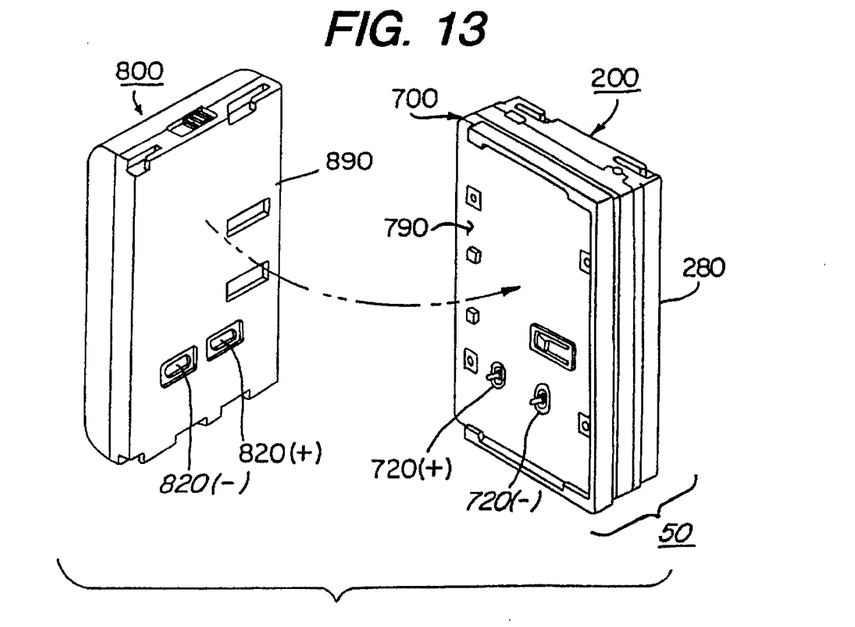
FIG. 13 shows a second preferred battery system wherein a conventional battery 800 is connected to a charger 50.
Figure 14:
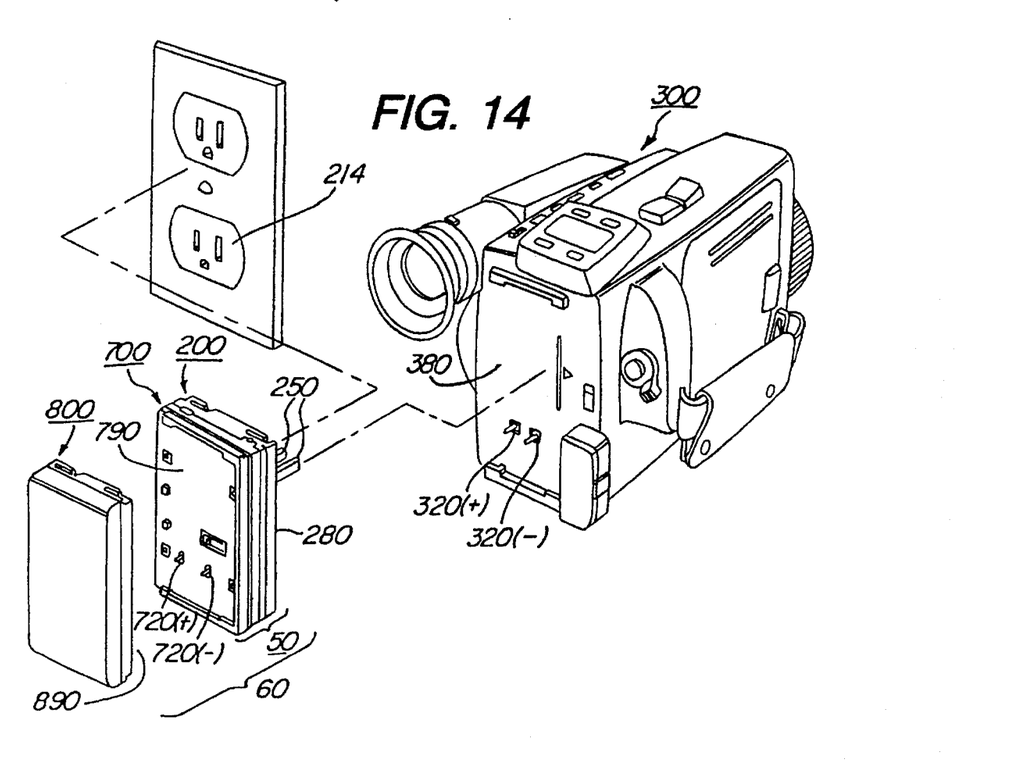
FIG. 14 shows how a conventional battery 800 is connected to the charger 50 which are then connectable, as a unit, to a wall socket 214 or a camcorder 300.

The conventional battery 800 is usually connected directly to the device 300 by engaging the battery's device mounting surface 890 with the device's complementary battery mounting surface 380. The preferred portable charger 50 is designed to be sandwiched between the battery 800 and the device 300. Accordingly, it has two opposed mounting surfaces, a supplementary battery mounting surface 790, and a supplementary device mounting surface 280. A retractable plug 250 is preferably provided on the supplemental device mounting surface 280, the plug 250 being retracted when the battery/charger unit 60 is connected to the device 300 and extended when connected to the wall plug 214.

Figure 15:
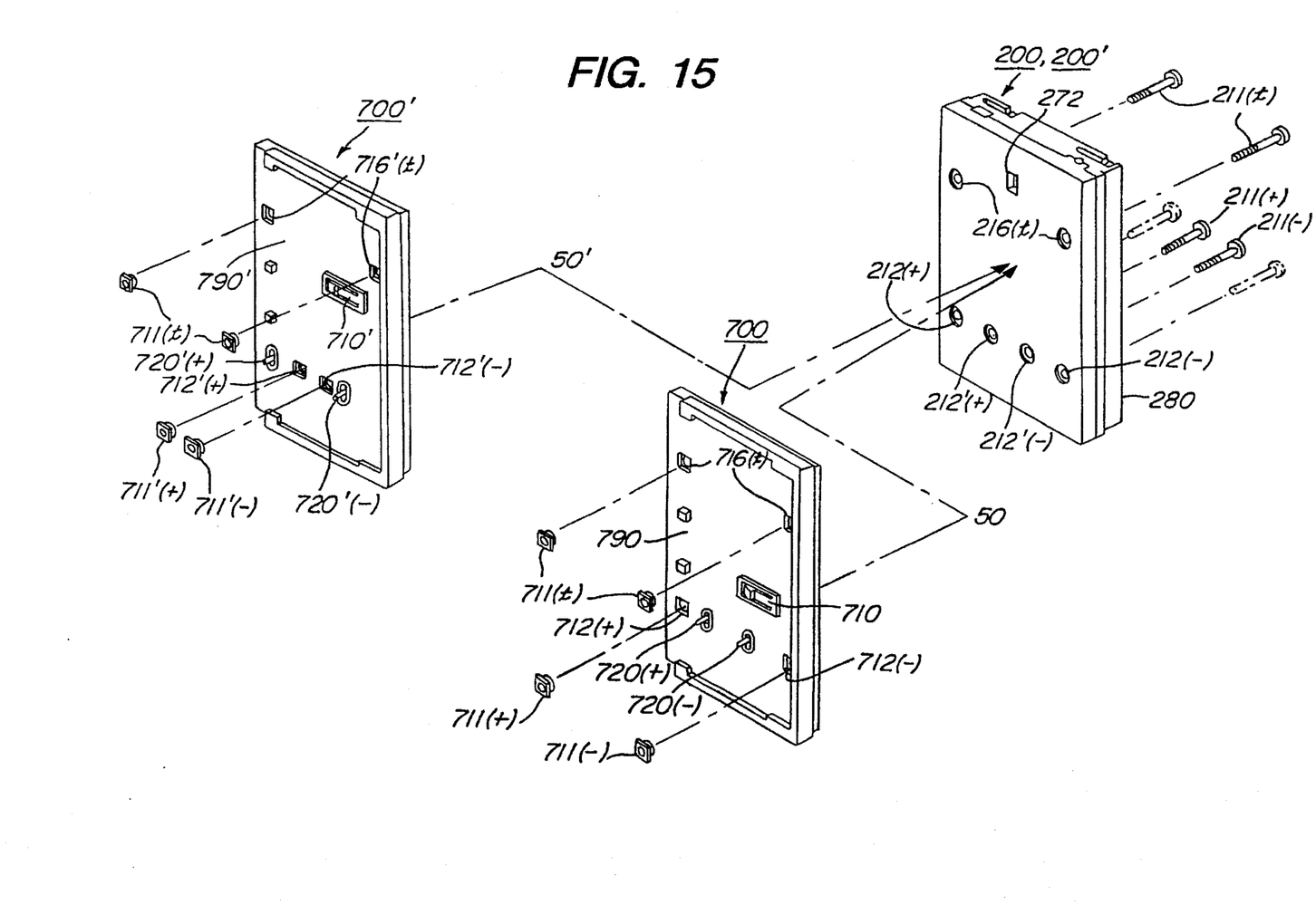
FIG. 15 shows alternative mounting modules 700, 700' being connected to alternative device mounting modules (identical to the charging modules 200, 200' of FIG. 6) to form a first charger 50 (lower) with narrowly-spaced-apart contacts or a second charger 50' with widely-spaced-apart contacts (upper)

As shown in FIG. 15, the preferred chargers 50, 50' respectively comprise alternative device mounting modules 200 or 200' (preferably identical to the charging modules 200, 200' of FIG. 6), and corresponding battery mounting modules 700 or 700', to accommodate a battery 800 (FIG. 13) having narrowly-spaced-apart connectors 820(+), (−) or a battery (not shown) having widely-spaced-apart connectors. A charging circuit is preferably located in the device mounting module 200. The charging circuit, however, could be located in the battery mounting module 700.

Figure 16A:
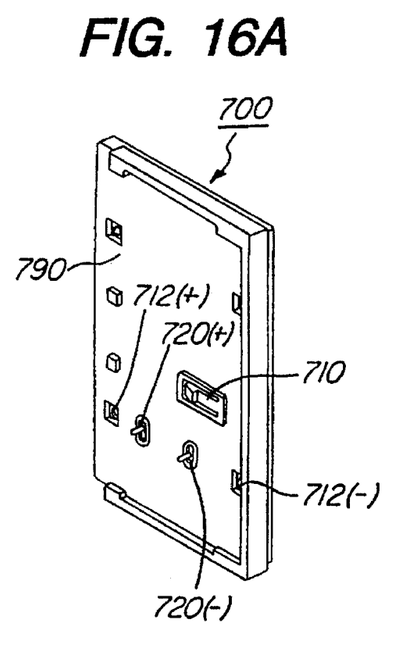
FIGS. 16A and 16B are front and rear perspective views of the first battery mounting module 700 having narrowly-spaced-apart contacts.
Figure 16B:
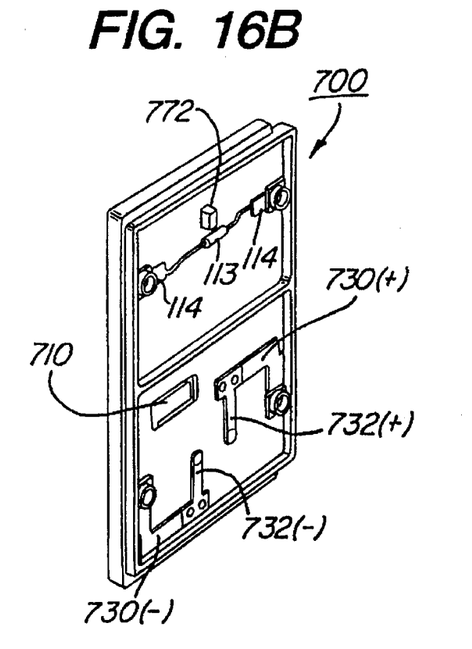
Figure 17A:
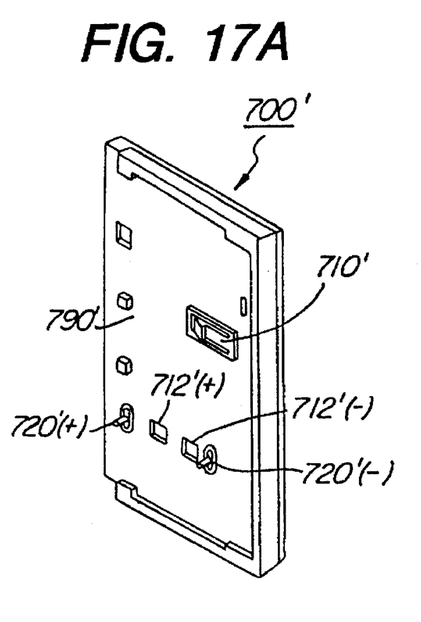
FIGS. 17A and 17B are front and rear perspective views of the second battery mounting module 700' having widely-spaced-apart contacts.
Figure 17B:
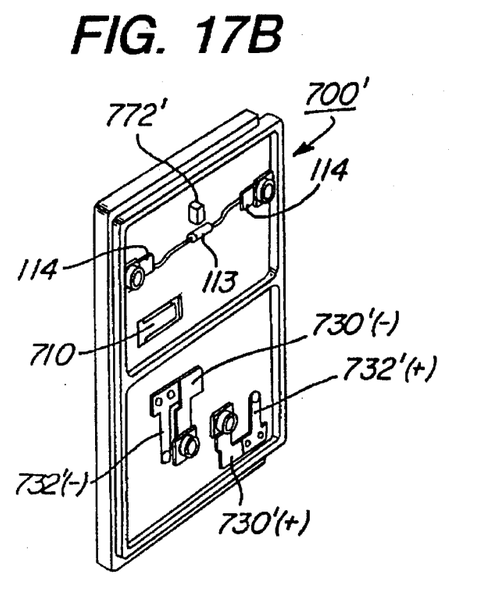

FIGS. 16 and 17 best show the narrowly-spaced-apart contacts 720(+), (−) and the widely-spaced-apart contacts 720'(+), (−) of the respective battery mounting modules 700, 700'. In each case, a main body portion 730 and a flexible finger 732 support the contact 720 from a back side of the module. The main body portion 730 extends through a slot into an aperture 712 to make contact with a pair of nuts 711(+), (−). As shown in FIG. 15, the nuts 711(+), (−) and a corresponding pair of bolts 211(+), (−) mechanically connect the battery mounting module 700 to the device mounting module 200 and electrically connect the contacts 720 to the device mounting module 200.

The preferred battery mounting modules 700, 700' further comprise a thermistor 113, having terminals 114, for providing temperature information to a charge control circuit. The terminals 114 are electrically connected to the charge control circuit with a pair of nuts 711(t), (t) and bolts 211(t), (t).

In a further aspect, the present invention provides a novel circuitry arrangement that resolves many of the prior art problems associated with weight, size, and performance.

FIG. 7 is a block diagram of preferred circuitry employed in the present invention. The preferred circuitry comprises a charger circuit 400, a charge control circuit 500, the battery module 100, and an optional fuel gauge circuit 600. In the preferred embodiment, the circuit board 260 in the charging module 200 contains the charger circuit 400 and charge control circuit 500 and the circuit board 140 in the battery module 100 contains the fuel gauge circuit 600.

As shown in FIG. 7, the preferred charger circuit 400 is designed to receive an AC input signal at input terminals AC1, AC2. The AC input signal is rectified to an oscillating DC signal through a full wave rectifier 410, smoothed across a capacitor C3, and then provided to a primary winding Np of a transformer T1. A pulse width modulation (PWM) circuit U1 periodically connects the primary winding Np to ground through a switch Q5 under the control of a feedback circuit (not shown in FIG. 7) to provide a regulated charge voltage output CVO.

Figure 8:
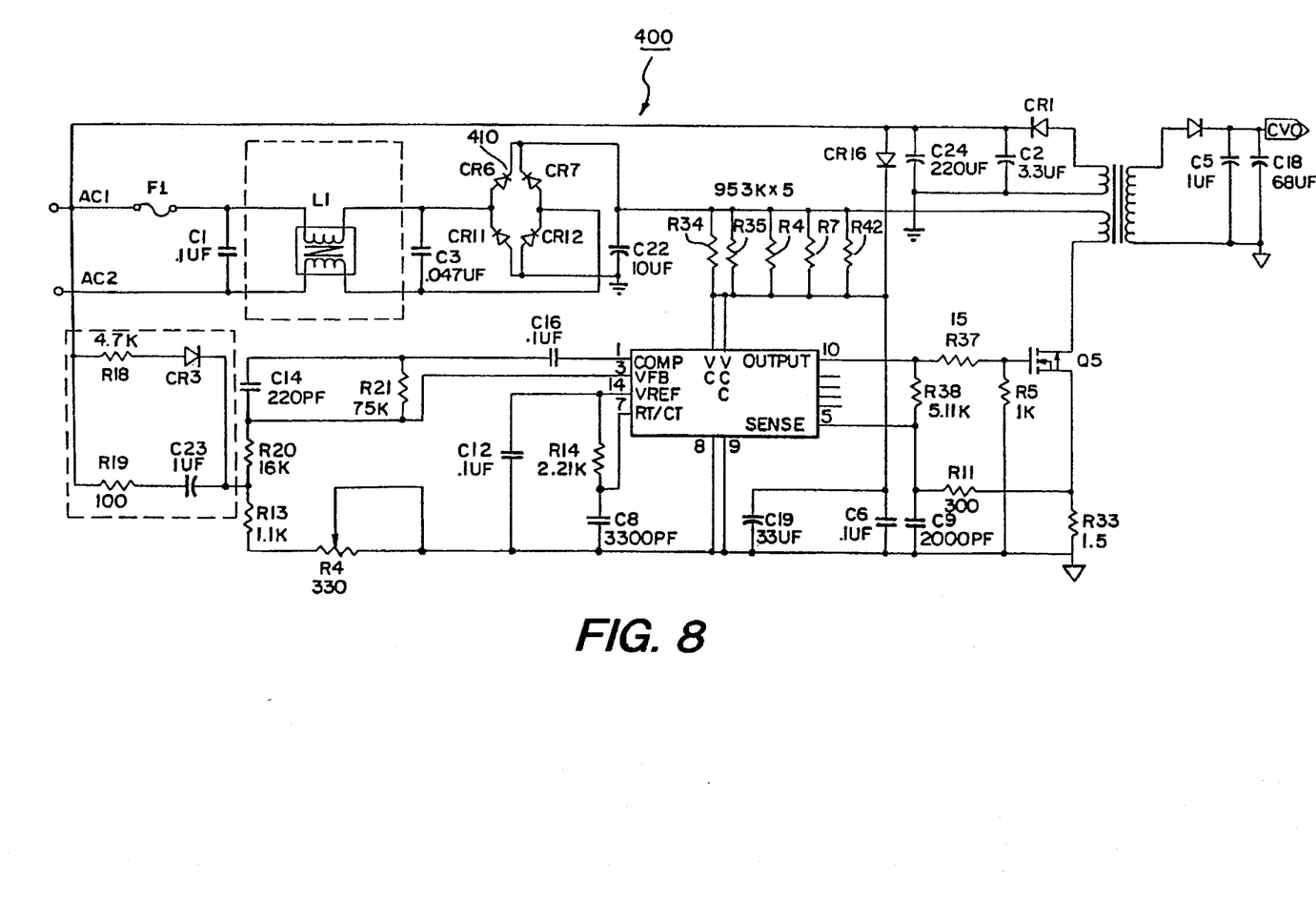
FIG. 8 is a schematic diagram of the charging circuit 400 of FIG. 7.
Figure 9:
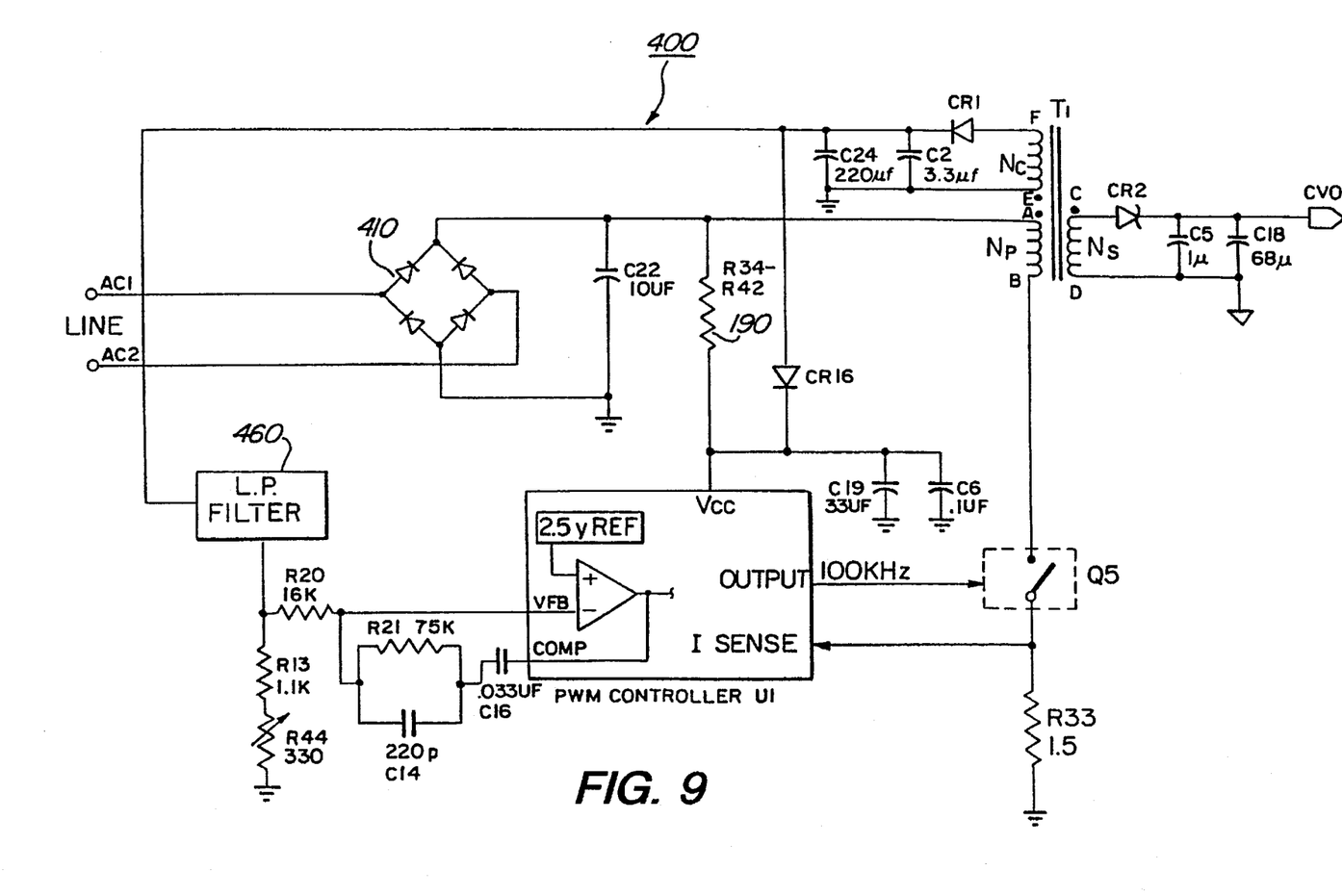
FIG. 9 is a simplified schematic diagram of the circuit shown in FIG. 8.

FIG. 8 illustrates a complete charging circuit 400 for use in the present invention. FIG. 9 is a simplification of the circuit shown in FIG. 8. The charging circuit produces a charge voltage output CVO of approximately 10 volts DC, at 1 ampere. The preferred circuit 400 can accommodate a line voltage of between 90 and 250 volts AC so that it can be used in most any country in the world.

The line voltage AC1, AC2 preferably passes through a safety fuse F1, across a capacitor C1, and through an EMI filter L1. The line voltage AC1, AC2 is then rectified by a full wave bridge rectifier 310 and smoothed across a capacitor C22 to produce an unregulated DC voltage. The unregulated DC voltage has an average value equal to the AC line voltage multiplied by the square root of 2 (approximately 1.414). A line voltage input range of 90–250 volts AC corresponds to an unregulated DC voltage range of 127–354 volts. The unregulated DC voltage is connected to the transformer T1.

Figures 10, 11:
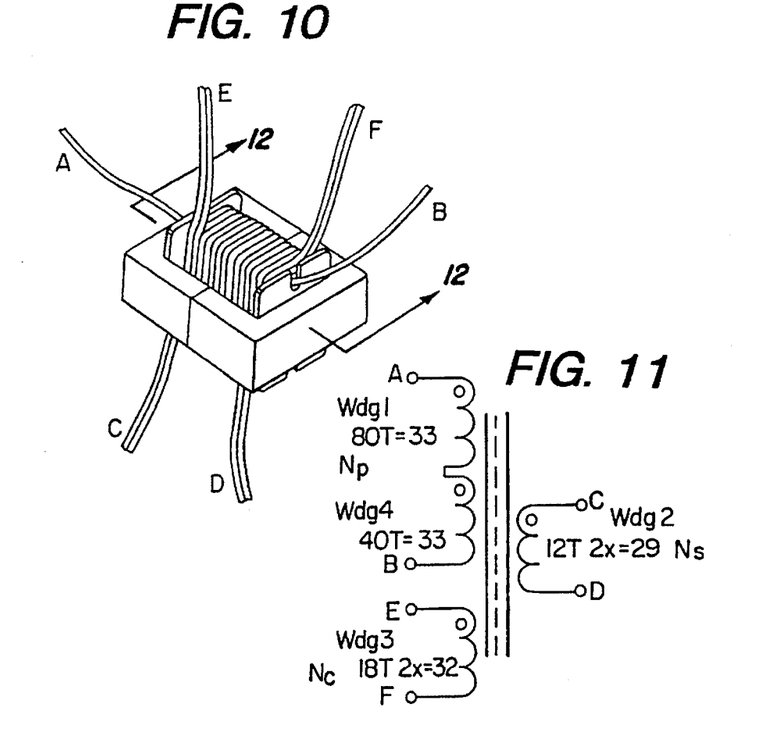
FIG. 10 is a perspective view of a specially wound transformer T1 used in the charging circuit 400 of FIGS. 8 and 9.
FIG. 11 is a schematic diagram of the transformer T1 of FIG. 10.
Figure 12:
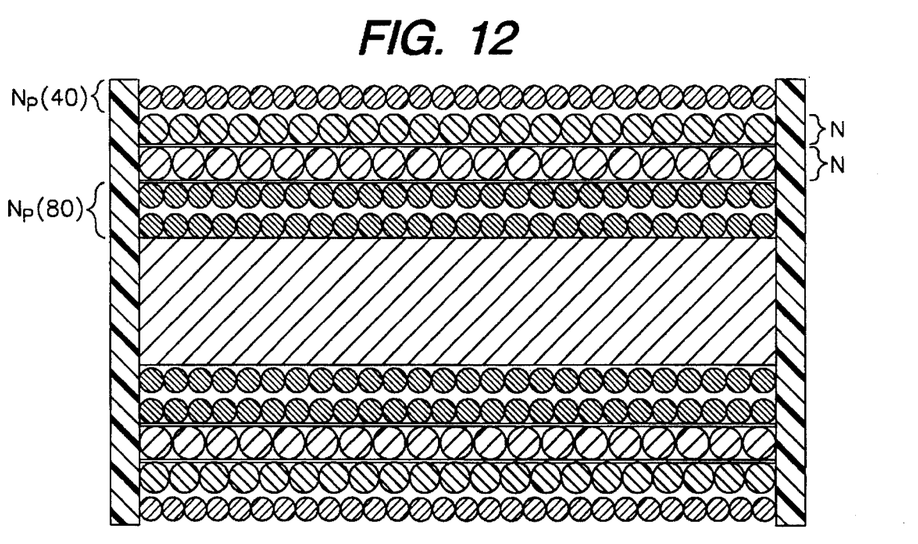
FIG. 12 is a cross-sectional view of the windings on the transformer T1 of FIG. 10.

The transformer T1 used in the preferred charging circuit 300 has a special construction. As shown in FIGS. 10, 11, and 12, the transformer T1 includes three windings, a primary winding Np having terminals A & B, a secondary winding Ns having terminals C & D, and a control winding Nc having terminals E & F. The primary winding Np has 120 turns of AWG 33 wire, the secondary winding Ns has 12 turns of AWG 29 wire, and the control winding Nc has 18 turns of AWG 32 wire. The secondary and control windings are preferably bifilar so that their total winding width approximates that of the primary.

The transformer T1 is specially wound. In particular, the primary winding Np surrounds the other windings Ns, Nc with 80 turns on the inside and the other 40 turns on the outside. The secondary winding Ns is wound directly over the first 80 turns and the control winding Nc is wound over the secondary winding, directly under the last 40 turns. Because of this winding scheme, the primary winding Np has a better magnetic coupling with the secondary winding Ns than with the control winding Nc. The benefit of this special winding scheme under a fault condition will be discussed below.

As mentioned above, the primary winding Np is periodically connected to and disconnected from ground by a semiconductor switch Q5 (e.g. a MOSFET) under the control of a pulse width modulation ("PWM") controller U1. The preferred controller U1 is a DC to DC fixed frequency current mode controller sold by Unitrode Integrated Circuits Corporation as Part No. UC3844A. This controller has a maximum duty cycle of 50%.

As best shown in FIG. 9, terminal A of the primary winding is connected to the unregulated DC voltage and terminal B is connected to ground through the switch Q5. When the switch Q5 closes, the primary winding Np is connected to ground, a current flows, and magnetic energy is stored in the winding. The rectifiers CR1, CR2 connected to the secondary and control windings Ns, Nc are reverse biased at this time. Consequently, no energy is transferred. When the switch Q5 opens, however, the magnetic field in the primary winding Np collapses ("flies back"), the polarity of all transformer windings reverses so that the rectifiers CR1, CR2 are forward biased, and the energy that was stored in the primary winding Np is transferred to the other windings Ns, Nc.

The switch Q5 is repetitively closed by the controller U1 at a fixed frequency. The controller has an internal oscillator that runs at 100 kHz, as determined by a capacitor C8 and a resistor R14. At 100 KHz, the switch Q5 is closed once every 10 uS to start a pulse and then reopened to stop the pulse. The width of each pulse is modulated on the basis of the available line voltage and load conditions as explained below.

The current imposed on the secondary winding Ns is output across a pair of capacitors C5, C18 as the charge voltage output CVO. The current imposed on the control winding Nc is output across another pair of capacitors C2, C24 to the PWM controller U1. The control winding Nc serves two purposes in connection with the PWM controller U1: (1) it provides the controller with a sustained operating voltage Vcc across the capacitor C24; and (2) it provides the controller with galvanically isolated feedback information that is proportional to the output voltage VCO.

The preferred controller U1 will start operating when the operating voltage Vcc reaches 16 volts. When power is first turned on, the unregulated DC voltage begin to charge a capacitor C19 through five parallel ¼W resistors R34, R35, R4, R7, R42. Each resistor has a nominal resistance of 953K to provide a parallel resistance of about 190k ohms. The diode CR16 prevents the capacitor C19 from discharging toward the control winding Nc. When the voltage across the capacitor C19 reaches 16 volts, the controller U1 starts and turns on the switch Q5 to connect the primary winding Np to ground. As explained above, magnetic energy is stored in the primary winding Np as current flows.

The controller U1 is a "current mode" controller, meaning that it turns the switch Q5 off after the current flowing through the primary winding Np reaches a predetermined level. The controller senses the current by measuring a proportional voltage across a current sensing resistor R33 at its "I Sense" input. The controller U1 turns off the switch Q5 when sensed voltage across R33 reaches 1 volt. At that time, the magnetic field of the primary winding Np collapses and the stored energy is transferred to the other windings Ns, Nc. This "current mode" operation allows for the wide range of AC line voltage (90–250 volts) because the current ramp will vary as a function of the applied line voltage.

The just-described on/off cycle will stop if the start-up voltage Vcc on the capacitor C19 drops too low. For self-sustained operation, then, the capacitor C19 should store enough energy to run the controller long enough for the control winding Nc to charge the capacitor C24 to provide continuous operating voltage Vcc. The transformer's special winding scheme (described above) takes advantage of the controller's U1 dependance on the control winding Nc for continued operating voltage to shut the system off under a fault condition. As described above, the primary Np has a relatively weak coupling with the control winding Nc as compared to the secondary winding Ns. Consequently, if there is a short circuit in the circuit driven by the secondary, then the energy stored in the primary winding Np will dissipate quickly into the secondary winding Ns and the control winding Nc will not have enough induced current to sustain the controller U1.

The control winding Nc also provides feedback information to the controller U1 to directly regulate the control winding Nc and indirectly regulate the secondary winding Ns. The feedback current from the control winding Nc passes through a low pass filter 360 and impresses a proportional feedback voltage across a fixed resistor R13 and variable resistor R44. The variable resistor R44 allows for calibration of the output voltage CVO. The low pass filter 360 beneficially removes the sharp fly-back spikes that are caused by the self-inductance of the primary winding Np. The result is a galvanically isolated control loop that provides a level of regulation that is usually available only with direct feedback.

The charger control circuit 500 is preferably accomplished with an integrated circuit 510, Part No. bq2003, manufactured by Benchmarq. The supporting components are readily available from application notes for the bq2003 chip, and other similar chips, and will not be discussed here except to point out the specific circuitry used to enable the "preconditioning" or discharge mode. The Benchmarq chip 510 generally functions to control the charging circuit by initiating charge and optionally discharge cycles, and provides for charge termination through monitoring the voltage and temperature of the rechargeable battery 122. A trickle charging mode is entered following the normal quick charge cycle, useful for maintaining charge in the battery when the battery system is stored in a wall receptacle providing AC. The preconditioning mode is initiated manually by momentary closure of switch 530 shown in FIG. 7. The charge control chip responds to the switch closure by turning on the transistor pair 520, discharging the battery to a predetermined level before starting a charge cycle.

The optional fuel gauge circuit 610 is also accomplished with a computing device manufactured by Benchmarq (Part No. bq2010). If used, the Benchmarq chip 610 is preferably mounted on the circuit board 140 carried by the plastic cover of the battery module 100 (FIG. 4). The circuit board 140 has a plurality of conductive pads 143 that are electrically connected to contacts 123 on the battery pack 120 with a plurality of spring contact 145 that extend through corresponding holes 135 in the plastic cover 130. The contacts 123 include a negative contact 123(−), a positive contact 123(+), and a sense resistor contact 123(r). A current sensing resistor 124 used by the fuel gauge circuit 610 is connected between the sensing resistor contact 123(r) and the negative contact 123(−) enabling the computing device to ascertain the amount of charge in the battery by accounting for current flowing in and out of the cells. The computing device 610 also provides capabilities for driving a display array of LED devices 142 mounted on the circuit board 140 (see FIG. 5) indicating the amount of available capacity in the battery in multiple linear increments. The display is activated by applying pressure to a switch comprising a conductive area on the underside of the graphical overlay 150 and a conductive area on the circuit board 140. The supporting components of the Benchmarq bq2010 and similar devices are readily available from application notes and will not be discussed here.

We claim:

1. A modular battery system useful for recharging a rechargeable battery and for applying power to a pair of terminals of a portable device, the system comprising:
   a battery module for supporting the rechargeable battery within the battery module;
   a charging module having a retractable plug for connecting the charging module to an AC line voltage, said retractable plug controlled by a rotatable thumbwheel disposed in said charging module, said thumbwheel for moving said retractable plug, and a battery charging circuit for converting the AC line voltage to a DC charging current;
   interconnecting means for releasably mechanically fastening the charging module to the battery module, said interconnecting means comprising:
   a pair of conductive nuts connected to the rechargeable battery cells in the battery module;
   a pair of battery module apertures in a side of the battery module, the conductive nuts accessible through the battery module apertures;
   a pair of charging module apertures through the charging module aligned with the battery module apertures; and
   a set of conductive screws extending through the charging module apertures and battery module apertures into the conductive nuts to mechanically and electrically couple the two modules, the conductive screws and nuts making electrical contact with and between the charging module's charging circuit and the battery module's rechargeable battery, said fastening couple electrically connecting the circuit board of said charging module to a thermistor in said battery module;
   the battery module including connecting means for engaging with the interconnecting means each being electrically conductive for conducting the DC charging current of the charging module to the rechargeable battery cells of the battery module; and
   means for attaching the battery system, as a unit, to apply power to the terminals of the portable device.

2. The modular battery system of claim 1 wherein the conductive screws make electrical contact with the charging module's charging circuit by compressing a contact between the screw head and a conductive pad on the circuit board containing the charging circuit.

3. A modular battery system useful for recharging a rechargeable battery and for applying power to a pair of terminals of a portable device, the system comprising:
   a rechargeable battery comprising a plurality of battery cells, means for binding the cells in a stacked arrangement, and means for electrically connecting the cells to define a pair of battery terminals;
   a battery module for supporting the rechargeable battery within the battery module;
   a charging module having a retractable plug for connecting the charging module to an AC line voltage, said retractable plug controlled by a rotatable thumbwheel disposed in said charging module, said thumbwheel for moving said retractable plug, and a battery charging circuit for converting the AC line voltage to a DC charging current, said charging module sandwiched between the battery module and the portable device when the battery system is connected to the portable device;
   interconnecting means for releasably mechanically connecting the charging module to the battery module, said interconnecting means including:
   a pair of conductive nuts connected to the rechargeable battery cells in the battery module;
   a pair of apertures in a side of the battery module, the conductive nuts accessible through the battery module apertures;
   a pair of apertures through the charging module aligned with the battery module apertures; and a set of conductive screws extending through the charging module apertures and battery module apertures into the conductive nuts to mechanically and electrically couple the two modules, the conductive screws and nuts making electrical contact with and between the charging module's charging circuit and the battery module's rechargeable battery and thermistor;

the battery module including connecting means for engaging with the interconnecting means, and the connecting means and the interconnecting means each being electrically conductive for conducting the DC charging current of the charging module to the rechargeable battery cells of the battery module; and means for attaching the battery system, as a unit, to apply power to the terminals of the portable device.

4. The modular battery system of claim 3 wherein the conductive screws make electrical contact with the charging module's charging circuit by compressing a contact between the screw head and a conductive pad on the circuit board containing the charging circuit.

5. A modular battery system for a portable device, comprising:

a housing separable from the portable device;

means for supporting a rechargeable battery within the housing;

a retractable electrical plug attached to the housing for connecting to an alternating current supply line, said retractable plug controlled by a rotatable thumbwheel disposed in said charging module, said thumbwheel for retracting and extending said retractable plug from within said housing; and a battery charging circuit within the housing for converting an AC voltage from the plug to a DC battery charging current, the battery charging circuit comprising:

a transformer having a primary winding, a secondary winding, and a control winding, the primary winding having a reduced magnetic coupling with the control winding as compared to the secondary winding;

a switch for periodically grounding the primary winding to store magnetic energy in response to a switching control pulse of variable width; and a pulse width modulation (PWM) controller circuit for providing the switching control pulse in response to a feedback signal from the control winding of the transformer, the control winding further providing the PWM controller circuit with a bootstrapped operating voltage for continued operation, the reduced coupling between the primary winding and the control winding preventing the PWM controller circuit from continuing to receive an adequate bootstrapped operating voltage in the event of a short circuit connected to the secondary winding.

6. A charger for use with a portable device having a battery mounting surface and a battery pack having a device mounting surface that electromechanically connects to the battery mounting surface, the charger comprising:

a battery charging circuit for converting an AC line voltage to a DC charging current;

a supplemental battery mounting surface that matches the portable device's battery mounting surface for electromechanically mounting the battery pack to the charger rather than the portable device;

a supplemental device mounting surface that matches the battery pack's device mounting surface for electromechanically mounting the charger and a mounted battery pack to the portable device for operating the portable device by discharging the mounted battery pack through the charger, the charger remaining present during operation of the portable device for later recharging the mounted battery pack;

means for alternatively connecting the charger and the mounted battery pack to the AC line voltage for charging the battery pack with the DC charging current;

a device module having the supplemental device mounting surface;

a battery mounting module having the supplemental battery mounting surface; and means for electromagnetically connecting the battery mounting module to the device mounting module wherein the electromechanical connecting means comprises a plurality of conductive screws and conductive nuts.

\* \* \* \* \*